United States Patent [19]

Shibamori et al.

[11] 4,202,709

[45] May 13, 1980

[54] METHOD FOR MANUFACTURING ALUMINUM OR ALUMINUM ALLOY CLAD STEEL SHEET OR STRIP

[75] Inventors: Seiji Shibamori; Yoji Ishida, both of Nikko, Japan

[73] Assignee: Furukawa Aluminum Co., Ltd., Tokyo, Japan

[21] Appl. No.: 19,712

[22] Filed: Mar. 12, 1979

[30] Foreign Application Priority Data

Mar. 10, 1978 [JP] Japan .................................. 53/27280
Nov. 15, 1978 [JP] Japan ................................. 53/140660

[51] Int. Cl.$^2$ ............................................. C22F 1/04
[52] U.S. Cl. ............................. 148/11.5 Q; 148/12 R
[58] Field of Search ................. 148/11.5 Q, 12 R, 127

[56] References Cited

U.S. PATENT DOCUMENTS

| | | | |
|---|---|---|---|
| 2,490,543 | 12/1949 | Robertson et al. | 148/11.5 Q |
| 2,965,963 | 12/1960 | Batz et al. | 148/11.5 Q |
| 3,238,071 | 3/1966 | Holtzman et al. | 148/11.5 Q |
| 3,564,585 | 2/1971 | Camp | 148/11.5 Q |
| 3,884,729 | 5/1975 | Jackson et al. | 148/11.5 Q |

FOREIGN PATENT DOCUMENTS 47-48096 12/1972 Japan.
52-19146 2/1977 Japan.
1073428 6/1967 United Kingdom.
1217770 12/1970 United Kingdom.

OTHER PUBLICATIONS

*Explosive Manufacturing;* Engineer's Practical Library 6, issued on Jan. 25, 1949.

*Primary Examiner*—W. Stallard
*Attorney, Agent, or Firm*—Armstrong, Nikaido, Marmelstein & Kubovcik

[57] ABSTRACT

A method for manufacturing an aluminum or aluminum alloy clad steel sheet in an easy, economical manner. An aluminized steel sheet obtained by applying aluminum or an aluminum alloy to a steel sheet by hot dipping is heated to a temperature between 100° and 550° C. Then, an aluminum or aluminum alloy sheet having its bonding face cleaned and having room temperature is superposed on one side or each of two sides of the aluminized steel sheet. The superposed sheets are rolled together to a draft reduction percentage of 10 to 40% to roll bond the aluminum or aluminum alloy sheet or sheets with the aluminized steel sheet. Then, if desired, the roll bonded sheets are further subjected to either one or both of finish rolling and/or a softening treatment. An aluminum or aluminum alloy clad steel sheet thus obtained has excellent strength, corrosion resistance and bending formability

6 Claims, No Drawings

METHOD FOR MANUFACTURING ALUMINUM OR ALUMINUM ALLOY CLAD STEEL SHEET OR STRIP

BACKGROUND OF THE INVENTION

1. Field of the Invention

This invention relates to a method for manufacturing easily and with a high productivity an aluminum or aluminum alloy clad steel sheet having the same degree of corrosion resistance as that of aluminum or an aluminum alloy, the same degree of strength as steel sheet and also the same degree of mechanical properties and formability as those of steel sheet of deep drawing quality and yet has the excellent adhesion.

2. Description of the Prior Art

Aluminized steel sheet which is prepared by applying aluminum or an aluminum alloy (hereinafter called "aluminum") to a steel sheet by hot dipping in general for improved corrosion resistance is in practical use. However, in view of the formability such as bendability, deep drawing quality, etc., the aluminum coating of the aluminized steel sheet is compelled to be thin, 40μ and less. It also has defects such as pin holes on the surface. Therefore, it has been hardly possible to obtain a sufficient degree of corrosion resistance of the aluminized steel sheet due to the defects such as pin holes on the surface.

On the other hand, an aluminum-steel, composite sheet which is prepared by combining the surface of steel with aluminum has been known to be to impart corrosion resistant and equally has sufficient strength. The composite sheet has conventionally been manufactured by an explosive bonding method or by a cladding method.

In the explosive pressure bonding method, an explosion force is utilized to achieve pressure bonding. This method results in a high manufacturing cost and also is unfit for mass production.

The cladding method is classified into a method of carrying out a cold rolling process after a cladding process and hot rolling process with heating after the cladding.

In the case of cold rolling, in order to obtain a good bonding effect, the draft reduction percentage of the rolling process must be set at least at 70%. This necessitates use of a powerful rolling mill and therefore needs large scale facilities. Further, since the degree of work done on the material is great, work hardening tends to take place and this makes it difficult to use a thin aluminum sheet as surface material and a thin steel sheet as core material.

In the other method wherein hot rolling is carried out after cladding, a draft reduction percentage of 15 to 55% suffices for obtaining a good bonding effect. However, with this method, it is difficult to control the cladding ratio because aluminum tends to elongate faster than steel. Furthermore, in order to obtain a perfect bond, the heat treatment must be carried out in a reductive atmosphere to prevent the aluminum and the steel from high temperature oxidation. This results in higher cost of facilities and processing operations than normal hot rolling.

SUMMARY OF THE INVENTION

In view of the above prevailing circumstances, the inventors of the present invention have conducted studies for a method that permits easy manufacture of an aluminum clad steel sheet that possesses excellent strength, corrosion resistance and bending quality and is usable as a building material, materials for highway products such as sign boards, guard rails, etc. and materials for vehicular use. As a result of such studies, inventors have developed a method for the economical manufacture of an aluminum clad steel sheet to which both the excellent mechanical properties of steel sheet and the corrosion resistance of aluminum are imparted by obtaining a sufficient bond between the two at a low draft reduction percentage without the need for a heating treatment under a special condition that requires the reductive atmosphere that otherwise would have been needed in the conventional methods. In addition, the inventors also have developed a method for manufacturing an aluminum clad steel sheet whereby a sufficient bond is obtained through a rolling pressure bonding process performed at a low draft reduction percentage without impairing the excellent mechanical properties and formability of steel sheet and whereby the aluminum layer of the aluminum clad steel sheet never comes off until the fracture takes place during deep drawing work.

It is therefor an object of this invention to provide a method for manufacturing an aluminum clad steel sheet wherein an aluminized steel sheet which is obtained by hot dipping steel sheet with aluminum is heated to a temperature between 100° and 550° C.; to either one or both sides of which, an aluminum sheet or sheets of room temperature with cleaned cladding surface are superposed on and to a rolling process which is carried out to a draft reduction percentage between 10 and 40% to roll-bond the aluminum to the steel.

In this method, the hot dipping with aluminum can be carried out by the ordinary aluminum hot dipping method. As for the process for cleaning the cladding face of the aluminum sheet to be superposed on the aluminized steel sheet, such a cleaning process can be carried out, for example by polishing the bonding face with a wire brush, by acid cleaning with a nitric acid solution or the like, by an alkali treatment using a caustic soda solution of several percent of concentration, etc. However, this cleaning work may not be necessary if the roll bonding surface of aluminum sheet does not pick up any substance which would serve to deteriorate the bond. The rolling process to a draft reduction percentage of 10 to 40% is preferred to be carried out by one operation immediately after the aluminum sheet of room temperature (not exceeding 50° C.) having the cleaned bonding face is superposed on the aluminized steel sheet. If necessary, the aluminized steel sheet roll-bonded with the aluminum sheet by the rolling process may be finished by cold rolling.

In accordance with this invented method, the aluminum sheet of room temperature is superposed on the aluminized steel sheet heated to a temperature between 100° and 550° C. This is because, if the aluminized steel sheet is heated to a temperature of less than 100° C., a high draft reduction percentage is required in the same manner as in the conventional method of carrying out roll bonding by cold rolling. On the other hand, if the aluminized steel sheet is heated to above 550° C., oxidation takes place on the surface of the aluminized steel sheet to such a degree that sufficient roll bonding cannot be attained by the rolling process.

Meanwhile, the aluminum sheet is superposed on the heated aluminized steel sheet with the former having room temperature not exceeding 50° C. This is done for the purpose of retaining the deformation resistance of the aluminum sheet as close to that of the aluminized steel sheet as possible to facilitate the roll bonding and to obtain good results thereof.

Furthermore, the reason for carrying out the roll bonding process at a draft reduction percentage of 10 to 40% with an aluminum sheet of room temperature superposed on an heated aluminized steel sheet is as follows: If the draft reduction percentage is less than 10%, sufficient roll bonding is hardly attainable. If the draft reduction percentage is above 40%, the use of a powerful rolling mill becomes necessary, although rolling with such a high reduction percentage will not affect the bond and then this would increase the costs of facilities and operation costs. This is not economical.

The aluminum clad steel sheet obtained in this manner may be further processed, if necessary, to the desired thickness through a cold finish rolling.

The invented method is suitable for application to a continuous roll bonding process of a heated aluminized steel strip together with a aluminum strip which has had its bonding surface cleaned and which is superposed on the aluminized steel strip. However, this invention is not limited to such application but is also applicable to a process wherein a heated aluminized steel sheet and an aluminum sheet, both cut to a short standard length, may be rolled and bonded together.

It is another object of this invention to provide a method wherein an aluminized steel sheet which has aluminum applied thereto by hot dipping is heated to a temperature between 100° and 550° C.; then an aluminum sheet or sheets of room temperature, having the bonding face or faces thereof cleaned, are superposed on either one surface or both surfaces of the aluminized steel sheet; these sheets are subjected to a rolling process carried out with a draft reduction percentage between 10 and 40% to roll bond the aluminum sheet or sheets with the aluminized steel sheet; and, after that, the roll bonded aluminum clad steel sheet obtained in this manner is subjected to a softening treatment which is carried out at a temperature between 400° and 580° C. This method is carried out in the following manner: The aluminized steel sheet which is obtained by applying aluminum to steel sheet through a normal aluminum dipping process is heated to a temperature between 100° and 550° C. Then, the aluminum sheet which has its bonding face cleaned by polishing with a wire brush, by acid cleaning with nitric acid or by an alkali treatment with a caustic soda solution of several percent of concentration and which has room temperature is superposed on one side or both sides of the aluminized steel sheet. Immediately after this, the aluminized steel sheet and the aluminum sheet or sheets superposed thereon are subjected together to a rolling process which is carried out once to a draft reduction percentage of 10 to 40% in order to have the aluminum sheet or sheets roll bonded with the steel sheet. Then, when necessary, the aluminum clad steel sheet obtained in this manner is subjected to a finish rolling process which is carried out to a roll reduction not exceeding 20%. Following the finish rolling process, a softening treatment is carried out at a temperature between 400° and 580° C.

In the above-stated second method, the reason for having the aluminum clad steel sheet obtained in the above stated manner is subjected to a softening treatment at a temperature between 400° and 580° C. after a finish rolling process carried out to a roll reduction not exceeding 20% in order to finish the aluminum clad steel sheet to a predetermined dimension lies in the aim to improve the roll bonded effect obtained by roll bonding and the forming workability and also to improve the formability of the aluminum clad steel sheet through the softening treatment. This is because the desired softening effect could not be achieved which is suitable for forming operation if the aluminum clad steel sheet is heat treated at a temperature below 400° C. If heat treated at a temperature above 580° C., this would serve to develop thick and brittle layer of diffusion along the boundary of steel and aluminum which would cause aluminum and steel sheet to separate during the forming work. The softening treatment can be carried out in the atmosphere at the temperature between 400° and 580° C. and does not have to be carried out in a specially selected atmosphere.

The objects, features and advantages of the invention will become apparent from the following description of embodiments thereof:

DETAILED DESCRIPTION OF THE PREFERRED EMBODIMENTS

EXAMPLE 1

An aluminized steel sheet, which measured 1.2 mm in thickness with an aluminum alloy containing 7 to 8% by weight of Si applied to the surfaces on both sides thereof to a thickness 20 to 30$\mu$ by a hot dipping process, was heated up to temperature values as shown by experiments No. 1–No. 9 in Table 1. Then, a semi-hard tempered aluminum sheet (AA 1100-H14), 0.3 mm in thickness, with its bonding face cleaned by polishing it with a wire brush and which had room temperature was superposed on each of both sides of the aluminized steel sheet. Immediately after the aluminum sheets had been superposed on both sides of the steel sheet, they were roll-bonded with each other by rolling process, which was carried out at varied draft reduction percentage values as shown by the experiments Nos. 1–9. Of these experiments, the experiments Nos. 3 and 4 were conducted by further performing a cold finish rolling process. An aluminum clad steel sheet was thus obtained from each of these experiments.

In addition to these experiments which were conducted in accordance with the invented method, aluminum clad steel sheets were also obtained through experiments of different methods which were conducted for the purpose of comparison under conditions differing from those of the invented method as shown by other experiments Nos. 10–13 also in Table 1.

Table 1

| Exp. No. | Aluminized steel sheet | | Aluminum sheet (AA 1100) | | Bonding rolling degree (%) | Thick. after rolling (mm) | Finish rolling degree (%) | Thick. of finished sheet (mm) |
|---|---|---|---|---|---|---|---|---|
| | Thickness (mm) | Temp. (°C.) | Thick. (mm) | Temp. (°C.) | | | | |
| Method of the present invention: | | | | | | | | |
| 1 | 1.2 | 150 | 0.3 | room | 20 | 1.44 | — | 1.44 |
| 2 | 1.2 | 400 | 0.3 | room | 20 | 1.44 | — | 1.44 |

Table 1-continued

| Exp. No. | Aluminized steel sheet Thickness (mm) | Aluminized steel sheet Temp. (°C.) | Aluminum sheet (AA 1100) Thick. (mm) | Aluminum sheet (AA 1100) Temp. (°C.) | Bonding rolling degree (%) | Thick. after rolling (mm) | Finish rolling degree (%) | Thick. of finished sheet (mm) |
|---|---|---|---|---|---|---|---|---|
| 3 | 1.2 | 400 | 0.3 | room | 20 | 1.44 | 10 | 1.30 |
| 4 | 1.2 | 400 | 0.3 | room | 20 | 1.44 | 20 | 1.15 |
| 5 | 1.2 | 500 | 0.3 | room | 20 | 1.44 | — | 1.44 |
| 6 | 1.2 | 200 | 0.3 | room | 10 | 1.62 | — | 1.62 |
| 7 | 1.2 | 100 | 0.3 | room | 30 | 1.26 | — | 1.26 |
| 8 | 1.2 | 550 | 0.3 | room | 10 | 1.62 | — | 1.62 |
| 9 | 1.2 | 550 | 0.3 | room | 30 | 1.26 | — | 1.26 |
| Comparison methods: | | | | | | | | |
| 10 | 1.2 | 400 | 0.3 | room | 3 | Not bonded | — | — |
| 11 | 1.2 | 400 | 0.3 | room | 6 | 1.69 | — | 1.69 |
| 12 | 1.2 | 580 | 0.3 | room | 20 | Not bonded | — | — |
| 13 | 1.2 | room | 0.3 | room | 20 | Not bonded | — | — |
| Aluminized steel sheet of thickness 1.2 mm | | | | | | | | |
| 14 | — | — | — | — | — | — | — | 1.20 |

Test pieces were cut out from the samples prepared through the experiments Nos. 1–13. Each sample was subjected to tests to measure its tensile strength and elongation. Further, each sample was subjected to a test which was conducted by bending it 180 degrees and to another test which was conducted by spraying salt water containing 5% by weight of NaCl at it for 5 days. The results of these tests are as shown in Table 2.

Further, for comparison, the same tensile test and the same corrosion resistance test were also conducted on the aluminized steel sheet sample (No. 14), 1.2 mm in thickness, used as core material.

The test results are also shown in Table 2.

Table 2

| | Properties | | |
|---|---|---|---|
| | Mechanical properties | Roll bonded effect: | Corrosion resist'ce; |
| Sample No. | Tensile strength (kg/mm$^2$) | Elongation (%) | Bended 180° (R = t) conducted once | Salt water spray with 5% NaCl |
| Invented method: | | | | |
| 1 | 38.4 | 6.7 | Not peeled off | No change |
| 2 | 45.1 | 5.5 | Not peeled off | No change |
| 3 | 45.8 | 5.0 | Not peeled off | No change |
| 4 | 47.8 | 4.2 | Not peeled off | No change |
| 5 | 47.6 | 4.7 | Not peeled off | No change |
| 6 | 36.4 | 11.6 | Not peeled off | No change |
| 7 | 42.0 | 4.1 | Not peeled off | No change |
| 8 | 37.2 | 10.5 | Not peeled off | No change |
| 9 | 47.1 | 3.7 | Not peeled off | No change |
| Comparison method: | | | | |
| 10 | — | — | — | — |
| 11 | 29.6 | 36.7 | Peeled off | — |
| 12 | — | — | — | — |
| 13 | — | — | — | — |
| Aluminized steel sheet of thickness 1.2 mm | | | | |
| 14 | 32.9 | 38.1 | — | Red rust produced |

It was confirmed that the samples obtained from experiments conducted in accordance with the invented method (No. 1–No. 9) had excellent effect of roll bonding between the aluminium and the steel. In the case of experiments deviating from the conditions of the invented method (Nos. 10–13), either the aluminum was not bonded with the steel in the stage of roll-bonding or, even if it was bonded, the claded material peeled off when the sample was subjected to a 180° bending test. Further, in the salt water spray test, the aluminized steel sheet produced red rust. Meanwhile, the aluminum clad steel sheet obtained by the method of this invention showed the same degree of corrosion resistance as aluminum.

The mechanical properties of the aluminum clad steel sheet obtained in accordance with the invented method proceed to possess higher tensile strength than the aluminized steel sheet and thus excelled in strength.

EXAMPLE 2

The same aluminized steel sheet of thickness 1.2 mm as the one used in Example 1 (Al - Si alloy containing 7 to 8% by weight of Si was applied by hot dipping to both sides of it) was used. The aluminized steel sheet was heated to the temperatures shownin Experiment Nos. 15–23 of Table 3. A semi-hard tempered aluminum alloy sheet (AA 3003), 0.3 mm in thickness of room temperature with its bonding face cleaned by polishing it with a wire brush, was superposed on both sides of the aluminized steel sheet. Immediately after the aluminum alloy sheet had been super-posed on both sides of the aluminized steel sheet, they were roll bonded with each other by a rolling process under the conditions shown in Experiments Nos. 15–23. In the experiments 17 and 18, a cold finish rolling was further carried out. An aluminum clad steel sheet was thus obtained from each of these experiments.

For comparison, aluminum clad steel sheets were also prepared under conditions differing from those of the invented method as shown in Experiments Nos. 24–27 of Table 3.

Table 3

| Exp. No. | Aluminized steel sheet Thick. (mm) | Aluminized steel sheet Temp. (°C.) | Aluminum sheet (AA 3003) Thick. (mm) | Aluminum sheet (AA 3003) Temp. (°C.) | Bonding rolling degree (%) | Thick. after rolling (mm) | Finish rolling degree (%) | Finished sheet thickness (mm) |
|---|---|---|---|---|---|---|---|---|
| Invented method: | | | | | | | | |
| 15 | 1.2 | 150 | 0.3 | room | 20 | 1.44 | — | 1.44 |
| 16 | 1.2 | 400 | 0.3 | room | 20 | 1.44 | — | 1.44 |

Table 3-continued

| Exp. No. | Aluminized steel sheet Thick. (mm) | Aluminized steel sheet Temp. (°C.) | Aluminum sheet (AA 3003) Thick. (mm) | Aluminum sheet (AA 3003) Temp. (°C.) | Bonding rolling degree (%) | Thick. after rolling (mm) | Finish rolling degree (%) | Finished sheet thickness (mm) |
|---|---|---|---|---|---|---|---|---|
| 17 | 1.2 | 400 | 0.3 | room | 20 | 1.44 | 10 | 1.30 |
| 18 | 1.2 | 400 | 0.3 | room | 20 | 1.44 | 20 | 1.15 |
| 19 | 1.2 | 500 | 0.3 | room | 20 | 1.44 | — | 1.44 |
| 20 | 1.2 | 200 | 0.3 | room | 10 | 1.62 | — | 1.62 |
| 21 | 1.2 | 100 | 0.3 | room | 28 | 1.30 | — | 1.30 |
| 22 | 1.2 | 550 | 0.3 | room | 10 | 1.62 | — | 1.62 |
| 23 | 1.2 | 550 | 0.3 | room | 28 | 1.30 | — | 1.30 |
| Comparison methods: | | | | | | | | |
| 24 | 1.2 | 450 | 0.3 | room | 3 | Not bonded | — | — |
| 25 | 1.2 | 400 | 0.3 | room | 6 | 1.69 | — | 1.69 |
| 26 | 1.2 | 580 | 0.3 | room | 20 | Not bonded | — | — |
| 27 | 1.2 | room | 0.3 | room | 28 | Not bonded | — | — |

Test pieces were cut out from the samples prepared through the experiments Nos. 15–27. Each sample was subjected to tests to measure its tensile strength and elongation. Further, each sample was bent 180 degrees. The results of these tests are shown in Table 4.

Table 4

| Sample No. | Mechanical properties Tensile strength (kg/mm$^2$) | Mechanical properties Elongation (%) | Roll bonded effect: Bended 180 degrees (R = t) |
|---|---|---|---|
| Invented method: | | | |
| 15 | 38.3 | 6.6 | Not peeled off |
| 16 | 45.3 | 5.6 | Not peeled off |
| 17 | 45.6 | 4.8 | Not peeled off |
| 18 | 48.5 | 5.1 | Not peeled off |
| 19 | 47.7 | 4.2 | Not peeled off |
| 20 | 35.8 | 11.4 | Not peeled off |
| 21 | 44.0 | 5.2 | Not peeled off |
| 22 | 37.0 | 10.2 | Not peeled off |
| 23 | 46.5 | 5.0 | Not peeled off |
| Comparison methods: | | | |
| 24 | — | — | — |
| 25 | 33.0 | 36.5 | Peeled off |
| 26 | — | — | — |
| 27 | — | — | — |

As apparent from Table 4, the aluminum clad steel sheet has a higher tensile strength than the aluminized steel sheet and does not have the aluminum cladding layer peeled off by the 180° bending test.

On the other hand, when the aluminum cladding is applied without heating the aluminized steel sheet as in the case of the experiment No. 27 or when the aluminum cladding is applied with the aluminized steel sheet heated to a high temperature as in the case of the experiment No. 26, there takes place no roll bonding through the rolling process. Further, when the rolling reduction is low as in the case of the experiment No. 24 of the comparison methods, either the aluminum does not bond with the steel or the aluminum cladding comes off when subjected to a 180° bending test. Thus, it is impossible to obtain a good bonding effect by these comparison methods.

EXAMPLE 3

An aluminized steel sheet was used which had mechanical properties measuring 27.5 kg/mm$^2$ in tensile strength and 38.1% in elongation and formability measuring 11.2 in Ericksen value and measuring 1.2 mm in thickness with an Al - Si alloy containing 7 to 8% by weight of Si having been applied to both sides thereof to a thickness between 20 and 30μ was used. This aluminized steel sheet was heated to temperature shown in Table 5. Then, a semi-hard tempered aluminum sheet (AA 1100 - H14) of room temperature, 0.3 mm in thickness, with its bonding face cleaned by polishing it with a wire brush, was superposed on both sides of the heated aluminized steel sheet. These sheets were then together immediately subjected to a rolling process which was carried out under conditions as shown also in Table 5. Then, a finish rolling process was carried out; and then each of the aluminum clad steel sheets which were thus obtained through these rolling processes was subjected to a softening treatment. Further, for the sake of reference, aluminum clad steel sheets were also prepared in accordance with conventional methods under conditions as shown in Table 5. Test pieces were cut out from the aluminum clad steel sheets and were subjected to tests to measure their tensile strength and elongation. In addition to these tests, a 180° bending test and an Ericksen test were also carried out. The test results were as shown in Table 6.

In the experiments conducted in accordance with the conventional methods, the steel sheet employed in these experiments was a steel sheet with deep drawing quality 31 kg/mm$^2$ in tensile strength, 46% in elongation and 10.7 in Ericksen value.

Table 5

| Exp. No. | Aluminized steel sheet Thick's (mm) | Aluminized steel sheet Temp. (°C.) | Aluminum sheet Thick. (mm) | Aluminum sheet Temp. (°C.) | Bonding rolling degree (%) | Thick. after rolling (mm) | Finish roll'g degree (%) | Finished sheet thick's (mm) | Soft'g treat't temp. (°C.) |
|---|---|---|---|---|---|---|---|---|---|
| Invented method: | | | | | | | | | |
| 28 | 1.2 | 270 | 0.3 | room | 27 | 1.31 | 18 | 1.07 | 560 |
| 29 | 1.2 | 500 | 0.3 | room | 20 | 1.44 | 0 | 1.44 | 560 |
| 30 | 1.2 | 500 | 0.3 | room | 10 | 1.62 | 0 | 1.62 | 500 |
| 31 | 1.2 | 400 | 0.3 | room | 20 | 1.44 | 10 | 1.30 | 450 |
| 32 | 1.2 | 150 | 0.3 | room | 25 | 1.35 | 20 | 1.08 | 500 |
| Comparison method: | | | | | | | | | |
| 33 | 1.2 | 400 | 0.3 | room | 5 | Not bonded | — | — | — |
| 34 | 1.2 | 400 | 0.3 | room | 20 | 1.44 | 10 | 1.30 | 300 |

Table 5-continued

| Exp. No. | Aluminized steel sheet Thick's (mm) | Aluminized steel sheet Temp. (°C.) | Aluminum sheet Thick. (mm) | Aluminum sheet Temp. (°C.) | Bonding rolling degree (%) | Thick. after rolling (mm) | Finish roll'g degree (%) | Finished sheet thick's (mm) | Soft'g treat't temp. (°C.) |
|---|---|---|---|---|---|---|---|---|---|
| 35 | 1.2 | 400 | 0.3 | room | 20 | 1.44 | 10 | 1.30 | 600 |
| 36 | 1.2 | 500 | 0.3 | room | 20 | Not bonded | — | — | — |
| 37 | 1.2 | room | 0.3 | room | 20 | Not bonded | — | — | — |
| Conventional methods: | | | | | | | | | |
| Hot rolling: | | | | | | | | | |
| 38 | 1.2 | 450 | 0.3 | 450 | 41.8 | 1.05 | 0 | 1.05 | 500 |
| Cold rolling: | | | | | | | | | |
| 39 | 1.2 | room | 0.3 | room | 70 | 0.84 | 0 | 0.84 | 550 |

Table 6

| Sample No. | Mechanical properties Tensile stren'th (kg/mm$^2$) | Elongation (%) | Formability 180° bending (R = t) | Ericksen value |
|---|---|---|---|---|
| Invented method: | | | | |
| 28 | 23 | 45.8 | Not peeled off | 11.6 |
| 29 | 24.2 | 47.1 | Not peeled off | 11.6 |
| 30 | 30.6 | 31.5 | Not peeled off | 10.8 |
| 31 | 33.4 | 25.0 | Not peeled off | 10.1 |
| 32 | 30.1 | 32.3 | Not peeled off | 11.0 |
| Comparison methods: | | | | |
| 33 | — | — | — | — |
| 34 | 42.0 | 7.2 | Not peeled off | 7.0 |
| 35 | — | — | Peeled off | — |
| 36 | — | — | — | — |
| 37 | — | — | — | — |
| Conventional methods: | | | | |
| Hot rolling: | | | | |
| 38 | 38.8 | 14.0 | Not peeled off | 8.7 |
| Cold rolling: | | | | |
| 39 | 31 | 17.5 | Not peeled off | 7.6 |

As apparent from Table 6, the elongation value and Ericksen value decrease in both cases of the conventional methods, whereas, in all of the experiments conducted in accordance with the method of the present invention, the elongation and the Ericksen value differ only to a slight degree from those values of the aluminized steel sheet. As regards the 180° bending test, the results of experiments conducted in accordance with the invented method also do not show any peeling of aluminum which is bonded to the steel sheet. This indicates excellent formability of the aluminum clad steel obtained by the invented method. Meanwhile, as indicated in the experiments of the comparative methods, no roll bonding is evidenced when the draft reduction percentage of the rolling process is lower than the draft reduction percentage specified by the invented method as in the case of the experiment No. 33; the elongation value and the Ericksen value decrease to a great degree when the softening treatment temperature is as low as that of the experiment No. 34; the aluminum clad layer is peeled off by the 180° bending test in the experiment No. 35 in which the softening treatment temperature is high. In both experiments 36 and 37 in which the aluminized steel sheet is heated either to a high temperature or to a low temperature, no roll bonding takes place through the rolling process. Therefore, it is apparent from these results of experiments that a satisfactory aluminum clad steel sheet cannot be obtained without conforming to the specified conditions of the invented method including the range of the aluminized steel sheet heating temperature, the range of draft reduction percentage, and the range of the softening treatment temperature.

EXAMPLE 4

An aluminized steel sheet which is the same as the one used in Example 3 measuring 1.2 mm in thickness, 27.5 kg/mm$^2$ in tensile strength, 38.1% in elongation and 11.2 in Ericksen value and both sides of which had an Al - Si alloy containing 7 to 8% by weight of Si applied thereto by hot dipping to a thickness between 20 and 30μ was used. The aluminized steel sheet was heated to temperature values as shown in Table 3. Then, semi-hard tempered aluminum alloy sheets (AA 3003 - H14) of room temperature, each 0.3 mm in thickness, with their bonding or bonding faces cleaned by polishing them with a wire brush, were superposed on both sides of the aluminized steel sheet; and a roll bonding was carried out under the conditions shown in Table 7. After the roll bonding, a finish rolling was conducted followed by a softening treatment to obtain an aluminum clad steel sheet. Test pieces were cut from the aluminum clad steel sheets which were prepared in the above stated manner. These test pieces were subjected to tests to measure their tensile strength and elongation. In addition to these tests, a 180° bending test and an Ericksen test were conducted on these test pieces. The test results obtained are shown in Table 8.

Table 7

| Exp. No. | Aluminized steel sheet Thic's (mm) | Aluminized steel sheet Temp. (°C.) | Aluminum alloy sheet Thic's (mm) | Aluminum alloy sheet Temp. (°C.) | Bonding rolling degree (%) | Thic's after rol'g (mm) | Finish rol'g degree (%) | Finished sheet thic's (mm) | Softn'g treat't temp. (°C.) |
|---|---|---|---|---|---|---|---|---|---|
| Invented method: | | | | | | | | | |
| 40 | 1.2 | 350 | 0.3 | room | 27 | 1.31 | 13 | 1.14 | 560 |
| 41 | 1.2 | 100 | 0.3 | room | 27 | 1.31 | 20 | 1.05 | 500 |
| 42 | 1.2 | 400 | 0.3 | room | 20 | 1.44 | 10 | 1.30 | 400 |
| 43 | 1.2 | 400 | 0.3 | room | 25 | 1.35 | 0 | 1.35 | 500 |
| 44 | 1.2 | 500 | 0.3 | room | 10 | 1.62 | 5 | 1.54 | 500 |
| Comparison methods: | | | | | | | | | |
| 45 | 1.2 | 70 | 0.3 | room | 20 | Not bonded | — | — | 500 |
| | | | | | | Not | | | |

Table 7-continued

| | Aluminized steel sheet | | Aluminum alloy sheet | | Bonding rolling | Thic's after | Finish rol'g | Finish-ed sheet | Softn'g treat't |
|---|---|---|---|---|---|---|---|---|---|
| Exp. No. | Thic's (mm) | Temp. (°C.) | Thic's (mm) | Temp. (°C.) | degree (%) | rol'g (mm) | degree (%) | thic's (mm) | temp. (°C.) |
| 46 | 1.2 | 580 | 0.3 | room | 20 | bonded | — | — | 500 |
| 47 | 1.2 | 450 | 0.3 | room | 5 | Not bonded | — | — | 500 |
| 48 | 1.2 | 450 | 0.3 | room | 20 | 1.44 | 0 | 1.44 | 300 |
| 49 | 1.2 | 450 | 0.3 | room | 20 | 1.44 | 10 | 1.30 | 600 |

Table 8

| | Mechanical properties | | | |
|---|---|---|---|---|
| | Tensile | | Formability | |
| Sample No. | stren'th (kg/mm$^2$) | Elongation (%) | 180° bending (R = t) | Ericksen value |
| Invented method: | | | | |
| 40 | 25.2 | 46.6 | Not peeled off | 16.6 |
| 41 | 30.8 | 32.4 | Not peeled off | 10.7 |
| 42 | 34.5 | 25.0 | Not peeled off | 10.1 |
| 43 | 30.4 | 31.3 | Not peeled off | 11.0 |
| 44 | 30.2 | 32.0 | Not peeled off | 11.0 |
| Comparison methods: | | | | |
| 45 | — | — | — | — |
| 46 | — | — | — | — |
| 47 | — | — | — | — |
| 48 | 43.0 | 7.0 | Not peeled off | 7.2 |
| 49 | — | — | Peeled off | — |

As apparent from Table 8, the aluminum clad steel sheet obtained in accordance with the method of the present invention does almost equals to the aluminized steel sheet in tensile strength and Ericksen value. Besides, when it is subjected to the 180° bending test, the aluminum never comes off thus showing its excellent formability. Meanwhile, as apparent from the results of the experiments conducted in accordance with the comparison methods, roll bonding was not achieved by the rolling process when the temperature of heating the aluminized steel sheet is low as in the case of the experiment No. 45 or high as in the case of No. 46; and roll bonding is also not possible when the rolling process is carried out at a low draft reduction percentage. Further, elongation and Ericksen value and formability decrease when the softening treatment temperature is low. On the other hand, when the softening temperature is too high, the bonding strength attained by roll bonding decreases and the aluminum layer is caused to come off by the 180° bending test.

As mentioned in the foregoing, the invented method permits easy manufacture of an aluminum clad steel sheet that dually has the excellent mechanical properties of steel sheet and the excellent corrosion resistance of aluminum and which also has sufficient roll-bonded adhesion to withstand bending work load.

Further, in accordance with the invented method, it enables to manufacture an aluminum or aluminum alloy clad steel sheet that almost equals to the steel sheet with deep drawing quality in mechanical properties and formability and yet has excellent corrosion resistance.

The invented method therefore has a great advantage for industrial applications.

What is claimed is:

1. A method for manufacturing an aluminum or aluminum alloy clad steel sheet wherein an aluminized steel sheet which is obtained by applying aluminum or an aluminum alloy to a steel sheet by hot dipping is heated up to a temperature between 100° and 550° C.; then, an aluminum or aluminum alloy sheet which has room temperature and has a bonding face thereof cleaned is superposed on one side or on each of two sides of said aluminized steel sheet; and the superposed sheets are together subjected to a rolling process which is carried out at a draft reduction percentage between 10 and 40% to roll-bond said aluminum or aluminum alloy sheet or sheets with said steel sheet.

2. A method for manufacturing an aluminum or aluminum alloy clad steel sheet according to claim 1, wherein said bonding face or faces of said aluminum or aluminum alloy sheet or sheets are cleaned by polishing them with a wire brush, by acid cleaning or by an alkali treatment before said aluminum or aluminum alloy sheet or sheets are superposed on said aluminized steel wheet which has been heated up to a temperature between 100° and 550° C.

3. A method for manufacturing an aluminum or aluminum alloy clad steel sheet according to claim 1, wherein a finish rolling process is performed after said aluminum or aluminum alloy sheet or sheets have been roll bonded with said aluminized steel sheet.

4. A method for manufacturing an aluminum or aluminum alloy clad steel sheet wherein a aluminized steel sheet obtained by applying aluminum or aluminum alloy to a steel sheet by hot dipping, is heated up to a temperature between 100° and 550° C.; then, an aluminum or aluminum alloy sheet having room temperature and having a bonding face thereof cleaned is superposed on one side or on each of two sides of said aluminized steel sheet; the superposed sheets are together subjected to a rolling process which is carried out to a draft reduction percentage between 10 and 40% to roll bond said aluminum or aluminum alloy steel or sheets with said steel sheet; and then a softening treatment is carried out at a temperature between 400° and 580° C.

5. A method for manufacturing an aluminum or aluminum alloy clad steel sheet according to claim 4, wherein said bonding face or faces of said aluminum or aluminum alloy sheet or sheets are cleaned by polishing them with a wire brush, by acid cleaning or by an alkali treatment before said aluminum or aluminum alloy sheet or sheets are superposed on said aluminized steel sheet which has been heated up to a temperature between 100° and 550° C.

6. A method for manufacturing an aluminum for aluminum alloy clad steel sheet according to claim 4, wherein said softening treatment is carried out subsequently to a finish rolling process which is carried out after said aluminum or aluminum alloy sheet or sheets have been roll bonded to said aluminized steel sheet.

* * * * *